United States Patent
Blumenschein et al.

(10) Patent No.: US 12,138,707 B2
(45) Date of Patent: Nov. 12, 2024

(54) ARRANGEMENT FOR MAKING A DIFFUSION SOLDER CONNECTION BETWEEN AN ELECTRICALLY CONDUCTIVE CONTACT ELEMENT AND A WORKPIECE

(71) Applicant: TE Connectivity Germany GmbH, Bensheim (DE)

(72) Inventors: Rudi Blumenschein, Woert (DE); Frank Kaehny, Bensheim (DE); Manuel Eheim, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 247 days.

(21) Appl. No.: 17/695,448

(22) Filed: Mar. 15, 2022

(65) Prior Publication Data
US 2022/0297226 A1  Sep. 22, 2022

(30) Foreign Application Priority Data
Mar. 16, 2021  (DE) .......................... 102021106393.0

(51) Int. Cl.
*B23K 20/00* (2006.01)
*B23K 20/02* (2006.01)
*B23K 20/26* (2006.01)

(52) U.S. Cl.
CPC ............ *B23K 20/026* (2013.01); *B23K 20/26* (2013.01)

(58) Field of Classification Search
CPC ............ B23K 20/1295; B23K 35/0288; B23K 11/0066; B23K 20/129
See application file for complete search history.

(56) References Cited

U.S. PATENT DOCUMENTS

| | | | | |
|---|---|---|---|---|
| 5,884,386 A * | 3/1999 | Blacket | ................. | B21J 15/025 29/522.1 |
| 5,975,406 A * | 11/1999 | Mahoney | ........... | B23K 20/1295 228/119 |
| 7,000,300 B2 * | 2/2006 | Daehn | ................. | B21D 39/031 29/283 |
| 8,043,021 B2 * | 10/2011 | Birkelbach | .......... | B23K 20/129 228/114.5 |
| 8,486,508 B2 * | 7/2013 | Christ | ................ | B23K 35/0288 228/114.5 |
| 9,056,370 B1 * | 6/2015 | Matlack | ............. | B23K 35/0255 |
| 9,068,583 B2 * | 6/2015 | Bray | ...................... | F16B 19/008 |
| 9,452,491 B1 * | 9/2016 | Littell | ..................... | F16L 55/13 |
| 10,478,916 B2 * | 11/2019 | Polewarczyk | ..... | B23K 20/1235 |
| 10,593,034 B2 * | 3/2020 | Spinella | ............ | B23K 11/0066 |
| 11,698,091 B2 * | 7/2023 | Hill | .................... | B23K 11/0066 228/113 |
| 2005/0022578 A1 | 2/2005 | Daehn | | |
| 2013/0094896 A1 * | 4/2013 | Christ | ....................... | F16B 5/08 403/267 |

(Continued)

*Primary Examiner* — Erin B Saad
(74) *Attorney, Agent, or Firm* — Barley Snyder

(57) ABSTRACT

An arrangement for making a diffusion solder connection between an electrically conductive contact element and a workpiece includes a protective chamber and an acceleration device. The protective chamber has a workpiece position at which at least a portion of the workpiece is arranged. The acceleration device shoots the electrically conductive contact element into the workpiece arranged at the workpiece position.

16 Claims, 4 Drawing Sheets

(56) References Cited

U.S. PATENT DOCUMENTS

| | | | |
|---|---|---|---|
| 2015/0217395 A1* | 8/2015 | Spinella | F16B 37/061 |
| | | | 403/267 |
| 2017/0122352 A1 | 5/2017 | Van Niekerk et al. | |
| 2018/0154426 A1* | 6/2018 | Xiao | B23K 20/22 |
| 2019/0126384 A1 | 5/2019 | Polewarczyk et al. | |
| 2019/0366472 A1* | 12/2019 | Toguyeni | F16L 55/1116 |

* cited by examiner

ARRANGEMENT FOR MAKING A DIFFUSION SOLDER CONNECTION BETWEEN AN ELECTRICALLY CONDUCTIVE CONTACT ELEMENT AND A WORKPIECE

CROSS-REFERENCE TO RELATED APPLICATIONS

This application claims the benefit of the filing date under 35 U.S.C. § 119(a)-(d) of German Patent Application No. 102021106393.0, filed on Mar. 16, 2021.

FIELD OF THE INVENTION

The present invention relates to an arrangement for making a diffusion solder connection between an electrically conductive contact element and a workpiece.

BACKGROUND

In many applications, it is necessary to insert a contact element into a workpiece. A workpiece can be a stack of sheets. Individual sheets or other individual rigid bodies are also possible as workpieces. In the case of a stack of sheets, a contact element inserted into the stack of sheets can mechanically and electrically conductively connect several sheets of the stack. An example of a specific application is module connectors of battery modules in electric vehicles, which are formed as sheets at least in sections. Aluminum is often used as the material in this example.

To connect the sheets with each other in a mechanically and electrically conductive manner, several methods are usually necessary. An opening extending through all the metal sheets is first generated, then a contact element is pressed or turned into this opening, and finally a soldering or welding connection is produced between the contact element and the metal sheets. When making this soldering or welding connection, the contact element and/or the stack of sheets must be heated at least in sections. In addition, the use of a solder is usually required. This can also be the case if a single sheet or other rigid body is machined as the workpiece.

In the case of materials such as aluminum, it is also problematic that the sheets form oxide layers on their surfaces when they come into contact with oxygen. In the above mentioned method steps, for example, an oxide layer forms on the inner walls of the opening during or after the generation of the opening for the contact element, before the contact element can be inserted. This oxide layer can later impair or prevent the electrical connection between the contact element and the sheets of the stack of sheets.

SUMMARY

An arrangement for making a diffusion solder connection between an electrically conductive contact element and a workpiece includes a protective chamber and an acceleration device. The protective chamber has a workpiece position at which at least a portion of the workpiece is arranged. The acceleration device shoots the electrically conductive contact element into the workpiece arranged at the workpiece position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
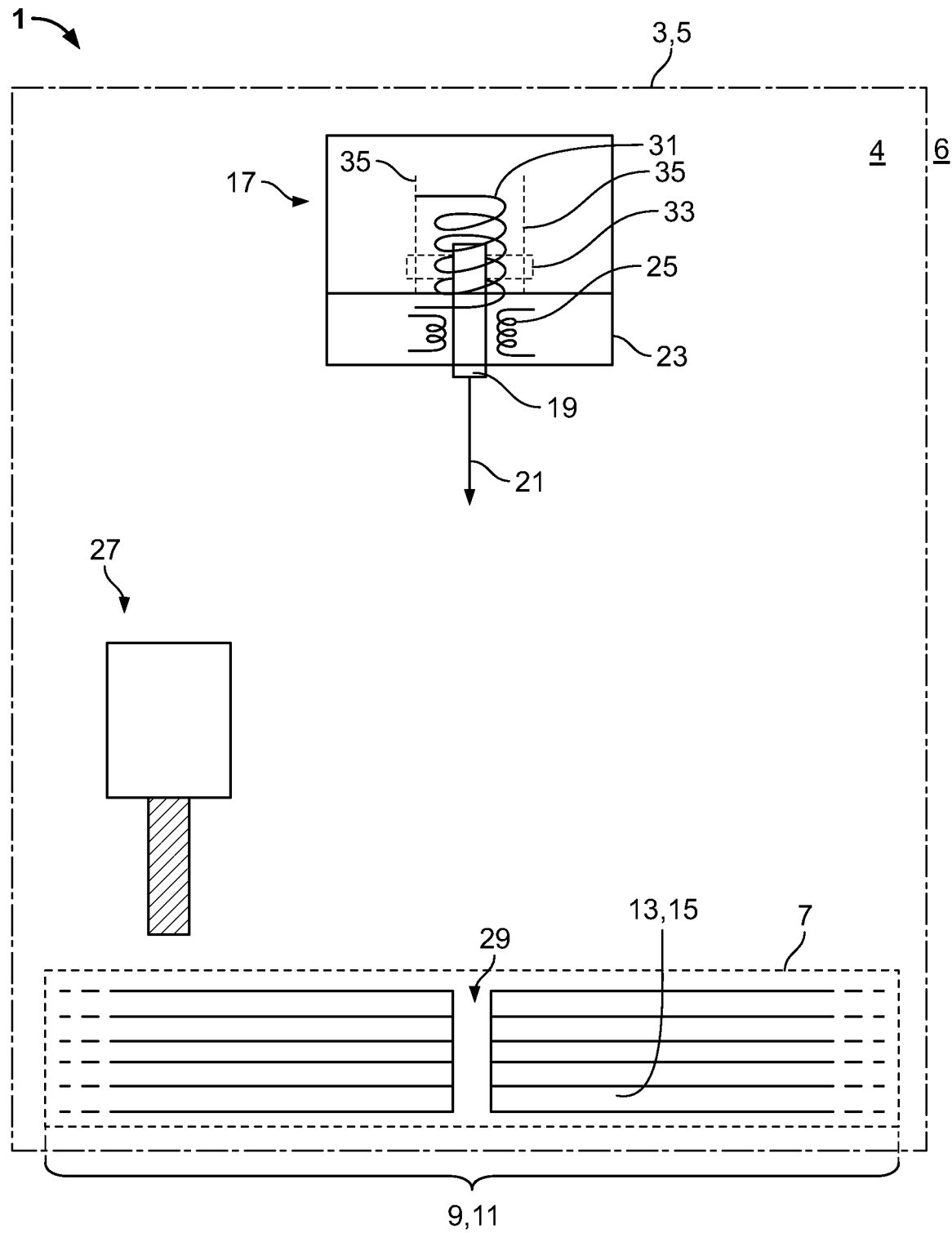
FIG. 1 is a schematic diagram of an arrangement according to an embodiment.

In the following, the invention is explained in more detail by way of embodiments with reference to the drawings. The combinations of features exemplarily shown in the embodiments can be supplemented by further features in accordance with the properties of the arrangement according to the invention required for a specific application. Likewise, individual features can be omitted from the embodiments described if the effect of this feature is not important in a specific application. In the drawings, the same reference signs are used for elements of the same function and/or the same structure. The figures are not to scale and serve merely to illustrate the invention.

In the following, an arrangement 1 according to the invention is described with reference to FIG. 1. The arrangement 1 comprises a protective chamber 3, which may be a vacuum chamber 5. That is, the protective chamber 3 can be configured to generate a negative pressure 4 relative to a normal pressure 6 prevailing outside the chamber 3.

Inside the protective chamber 3, as shown in FIG. 1, there is a workpiece position 7 at which a workpiece 9 can be arranged. The workpiece position 7 can have a holder for holding or a shelf for depositing the workpiece 9. Alternatively or additionally, an anvil or other suitable element can be provided at the workpiece position 7, which can absorb the forces occurring when a contact element impacts.

The workpiece 9, in the embodiment shown in FIG. 1, is a stack of sheets 11 formed from a plurality of sheets 13 arranged one above the other. The term "stack of sheets" refers to a plurality of sheets 13 lying on top of each other. In an embodiment, two adjacent sheets 13 abut each other directly. Alternatively, the workpiece 9 can also be a single sheet, a plate, another rigid body, or other types of workpieces. Only by way of example is the embodiment described with reference to a stack of sheets 11 as workpiece 9. In an embodiment, the sheets 13 are made of aluminum 15. The stack of sheets 11 can be arranged completely inside the protective chamber 3. Alternatively, it is also possible that only one portion of the stack of sheets 11, or of the workpiece 9, is arranged inside the protective chamber 3 and another portion is arranged outside the protective chamber 3.

In an embodiment, the sheets 13 each have a thickness of a few millimeters. For example, 1±0.5 mm. A number of sheets 13 in the sheet stack 11 may be between 3 and 6. However, less than 3 or more than 6 sheets 13 are also possible. The sheets 13 may be parts of module connectors of battery modules, especially for electric vehicles. Of course, sheets 13 with other functions can also be used.

The arrangement 1 comprises an acceleration device 17, as shown in FIG. 1. The acceleration device 17 serves to accelerate a contact element 19. The contact element 19 can be accelerated by the acceleration device 17 and shot along a shooting direction 21. The shooting direction 21, in an embodiment, points or extends towards the workpiece position 7, so that the contact element 19 can be shot into the stack of sheets 11. The contact element 19, in an embodiment, is made of copper 20 or an alloy containing copper. The shooting direction 21 is perpendicular to the stack of sheets 11 in an embodiment. This enables the contact element 19 to reach all the sheets 13 of the stack 11 or at least a subset to be connected along a short path.

The arrangement 1 may further comprise a heating element 23 shown in FIG. 1, which is, for example, provided with at least one induction coil 25 for heating the contact element 19. Furthermore, the arrangement 1 may comprise a drilling device 27, which is configured to generate a bore 29 in the stack of sheets 11.

The acceleration device 17 may be configured to accelerate the contact element 19 to more than 200 m/s, in an embodiment more than 300 m/s. Under certain circumstances, speeds of more than 600 m/s may also be required. In an embodiment, a speed range is between 300 and 600 m/s, in which the speed of sound at 20° C. also lies.

The acceleration device 17 has an electromagnetic system for acceleration. For example, the acceleration device 17 may comprise one or more coils 31 by which the contact element 19 can be accelerated according to the principle of a Gaussian gun or a railgun. Alternatively or additionally, the acceleration device 17 may include a carriage 33 (shown in dashed lines) which may be electrically conductively connected to current-carrying rails 35 so that the carriage 33 may be accelerated in the manner of a railgun when current flows through the rails 35 and the carriage 33. When current flows through the lines and the carriage 33, the carriage 33 is accelerated by the Lorentz force as an interaction between the magnetic fields generated in the lines and the current in the carriage 33. The carriage 33 can support and accelerate the contact element 19 or projectile 37. At the end of an acceleration path, the contact element 19 or projectile 37 can detach from the carriage 33 and fly in the direction of the workpiece 9 position. In a Gaussian gun, also called a coilgun, the contact element 19 and/or the projectile 37 can be magnetically accelerated by one or more coils arranged in series. This principle is similar to a linear motor.

The acceleration of the contact element 19 can be easily controlled based on the current intensity in the acceleration device 17 embodied as an electromagnetic system. In addition, these types of acceleration devices 17 are usually reusable.

The arrangement 1 can also have a magazine for receiving a plurality of contact elements 19 or projectiles 37, which is connected to the acceleration device 17. Thus, contact elements 19 can be fed to the acceleration device in rapid succession and accelerated by the acceleration device. After the impact of a contact element 19, a workpiece 9 change can take place or a workpiece 9 arranged in the workpiece position can be moved. Thus, several contact elements 19 can be shot into the same or different workpieces 9 one after the other.

Additional alternative possibilities for acceleration of a contact element 19 by the acceleration device 17 may include ignition of explosives. For example, the detonation of an explosive may accelerate an explosive plate or plunger, which transmits the movement to the contact element 19 and sets it in motion in the shooting direction 21.

Figure 2:
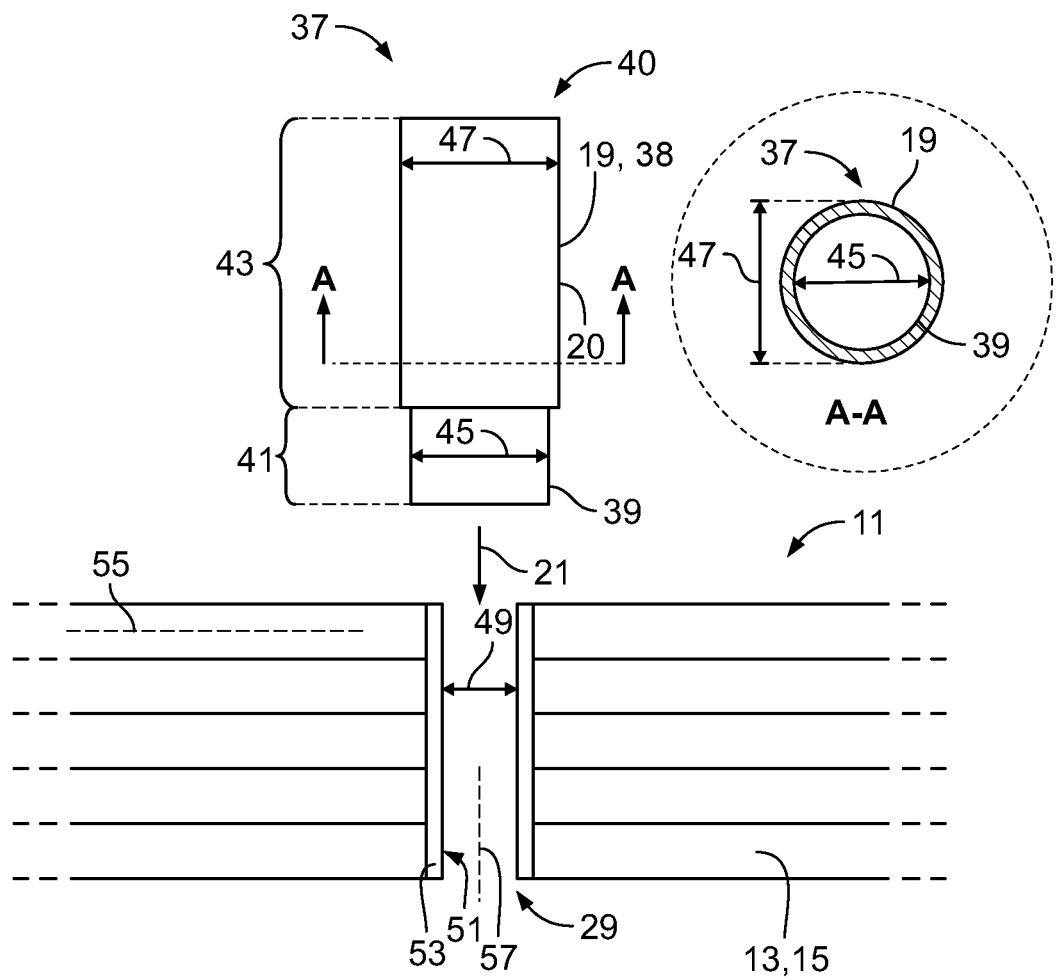
FIG. 2 is a schematic diagram of a projectile of the arrangement before impacting a stack of sheets.
Figure 3:
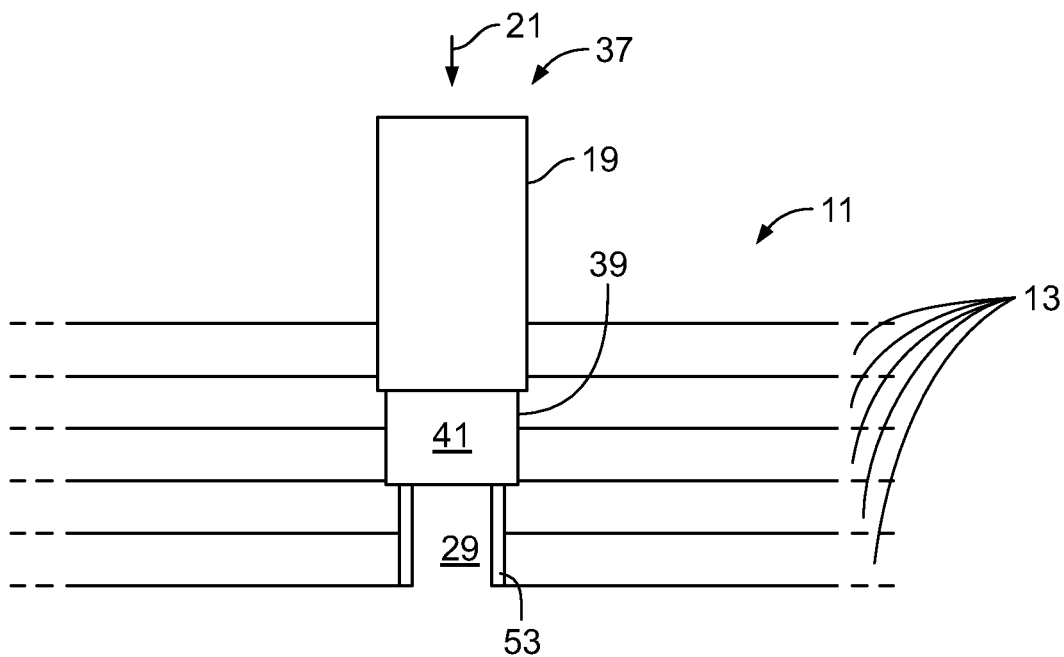
FIG. 3 is a schematic diagram of the projectile partially penetrating the stack of sheets.
Figure 4:
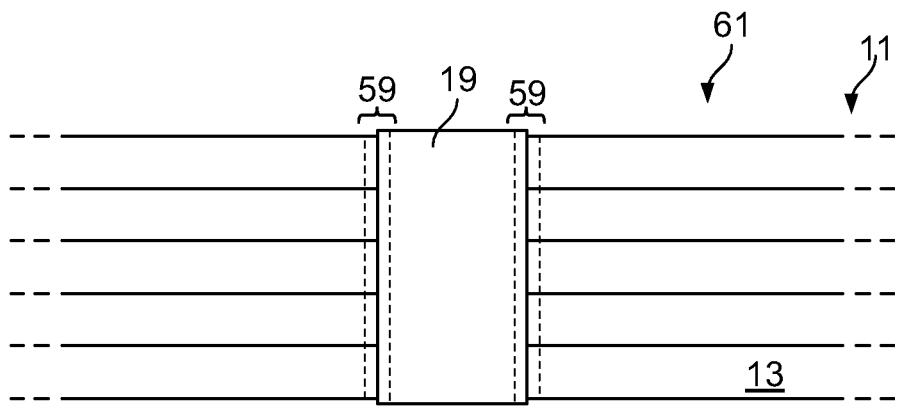
FIG. 4 is a schematic diagram with the stack of sheets and a contact element of the projectile forming a composite sheet.
Figure 4:
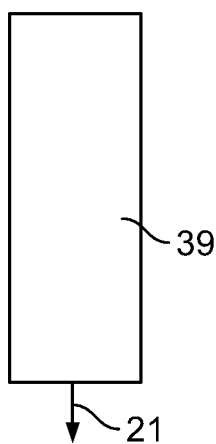

Reference is made in the following to FIGS. 2 to 4. Further details of the arrangement 1 as well as a projectile 37 according to the invention, a sheet metal composite 61 according to the invention, and the method according to the invention are explained in more detail. Reference is also made to FIG. 1.

First, a projectile 37 is described, which may be part of the arrangement 1. FIG. 2 shows the projectile 37 in a side view and in a cross-section along the section line A-A. The contact element 19 forms a sub-portion 38 of the projectile 37. The projectile 37 has a central body 39 with a cutting portion 41 and a supporting portion 43. The contact element 19 is arranged in the supporting portion 43. The cutting portion 41 is positioned in front of the supporting portion 43 in the shooting direction 21. This means that the cutting portion first impacts the stack of sheets 11.

The cutting portion 41 is configured to cut free at least portions of the sheets 13 of the stack of sheets 11. This will be discussed further below. The central body 39, in an embodiment, has a fully cylindrical shape, i.e. the shape of a bolt. The contact element 19 has a hollow cylindrical shape and is arranged to surround the central body 39 at its supporting portion 43. This also results in an overall cylindrical shape for the projectile 37. As an alternative to the cylindrical shape and the associated circular cross-section, the contact element 19 and/or the projectile 37 may be provided with a different cross-section. For example, the projectile 37 and/or only the contact element 19 can be provided with an elliptical or polygonal cross-section.

In other words, the central body 39 with its supporting portion 43 is inserted into the sleeve-shaped contact element 19. The central body 39 and the contact element 19 together form a composite 40. The central body 39 and the contact element 19 may be connected by a press-fit so that, particularly during acceleration, there is no unintentional separation of the two parts.

In an embodiment, the central body 39 is made of ferrite, in particular to facilitate electromagnetic acceleration. The contact element 19 may be made of copper 20 and serves to electrically and mechanically connect the sheets 13 of the stack of sheets 11, which may be made of aluminum 15.

A diameter 45 of the central body 39, in particular in the cutting portion 41, may be smaller than an outer diameter 47 of the contact element 19, as shown in FIG. 2. The diameter 45 of the central body 39 in the cutting portion 41 is larger than an inner diameter 49 of the bore 29.

The stack of sheet metal 11 may be provided with the bore 29 in preparation for connection to the contact element 19. Provided the stack of sheets 11 has been in contact with oxygen after the bore 29 has been generated, an oxide layer 53, shown in FIG. 2, will be present on an inner wall 51 of the bore 29. Generally, the surfaces of the sheets 13 also have oxide layers.

In the following, the method for making the diffusion solder connection is described. Arrangement 1 is preferably used to carry out the method.

As already described above, the bore 29 may be first made in the stack of sheets 11 in preparation for the making of the diffusion solder connection. The bore 29 extends perpendicular in an embodiment to the sheet planes 55 spanned by the sheets 13 of the stack of sheets 11. The bore 29 can be made in the stack of sheets 11 inside or outside the protective chamber 3.

After insertion of the bore 29, the stack of sheets 11, in particular the portion of the stack of sheets 11 comprising the bore 29, is arranged in the protective chamber 3 such that the shooting direction 21 coincides with an axis 57 of the bore 29, as shown in FIG. 2. In other words, the acceleration device 17 and the stack of sheets 11 are aligned relative to each other so that the contact element 19 can be shot into the bore 29. The contact element 19 can be heated by the heating element 23 before or during acceleration by the acceleration device 17. For example, the contact element 19 may be heated to a temperature between 400 and 600° C. However, this is not absolutely necessary in every embodiment.

Before the contact element 19 is shot into the stack of sheets 11, a vacuum 4 is generated in the protective chamber 3 in an embodiment. Alternatively, the protective chamber 3 can also be filled with a protective gas, in particular a noble gas, to reduce the risk of oxide layers forming on the workpiece 9 or the contact element 19. The vacuum 4 is generated so that there is not enough oxygen in the protective chamber 3 to cause oxide layers to form, or oxide layer growth is delayed.

To insert the contact element 19 into the stack of sheets 11, the projectile 37 is accelerated by the acceleration device 17 and flies along the shooting direction 21 toward the stack of sheets 11, as shown in the position of FIG. 2.

The projectile 37 flies ahead with the cutting portion 41 to the stack of sheets 11. When it impacts into the stack of sheets 11, the cutting portion 41 cuts off the portions of the sheets 13 surrounding the bores 29. In this process, the oxide layer surrounding the bores 29 is also cut off; superficial sections of the workpiece 9 can be removed by the impact of the contact element 19. This enlarges the bore 29 to the diameter 45 of the central body 39 in the cutting portion 41, as shown in FIG. 3. The inner diameter 49 of the bore 29 before the projectile 37 is shot in is 5 to 20% smaller than the outer diameter 45 of the central body 39 in the cutting portion 41. The outer diameter 45 of the central body 39 in the cutting portion 41 is, in an embodiment, 5 to 20% smaller than the outer diameter 47 of the contact element 19.

The supporting portion 43 with the contact element 19 arranged thereon follows the cutting portion 41 into the stack of sheets 11. This further enlarges the inner diameter of the bore 29. When the projectile 37 is inserted into the stack of sheets 11, the projectile 37 is decelerated. The kinetic energy of the projectile 37 is thereby converted into thermal energy. As a result, the projectile 37 heats up.

In an embodiment, the dimensions of the bore 29, the central body 39, and the contact element 19, as well as the speed of the projectile 37 and the heating of the projectile 37, which may have occurred previously, are coordinated so that the contact element 19 both penetrates the stack of sheets 11 until it connects all the sheets 13 of the stack of sheets 11 and has sufficient thermal energy to form a diffusion solder connection 59 with the sheets 13 of the stack of sheets 11. As a result, a subsequent generation of a diffusion solder connection by heating the workpiece 9 with the already inserted contact element 19 can be dispensed with. Soldering can also be dispensed with. Because the contact element 19 is positioned in these areas immediately after the impact, the reformation of oxide layers can be prevented.

The diffusion solder connection 59 is indicated as a dashed area in FIG. 4. In this area, atoms of the contact element 19 have diffused into the sheets 13 and atoms of the sheets 13 have diffused into the contact element 19. As a result, the contact element 19 is mechanically and electrically conductively connected to the sheets 13 of the stack of sheets 11. A sheet metal composite 61 is produced by this connection.

The protective chamber 3 of the arrangement 1 can be used to enclose splinters, vapors or gases generated when the contact element 19 impacts the workpiece 9 and to prevent them from spreading in an uncontrolled manner.

In the finished sheet metal composite 61, the central body 39 is no longer required. Therefore, it can be detached from the contact element 19 again and, in an embodiment, reused. In the simplest case, the central body 39 has sufficient kinetic energy to leave the stack of sheets 11 in the shooting direction 21 when it impacts into the stack of sheets 11. In other words, the central body 39 continues to fly out of a rear side of the stack of sheets 11, opposite the side on which the contact element 19 first impacts, while the contact element 19 remains in the stack of sheets 11. Alternatively, the central body 39 can be mechanically detached from the contact element 19 after the sheet composite 61 has been produced. For this purpose, the central body 39 can, for example, be pressed out of the contact element 19 with an appropriate tool, for example a punch. The central body 39 can then be provided with a new contact element 19 and shot again into a stack of sheets 11.

In another embodiment, the projectile 37 is constructed of successive portions, wherein the portions follow one another along the shooting direction 21. The contact element 19 may thereby form the rear portion, for example. In this way, the projectile 37 can penetrate the stack of sheets 11 with a portion in front of the contact element 19 and generate an opening. The contact element 19 then follows as the rear portion of the composite into the stack of sheets 11.

The arrangement 1 reduces or completely prevents the risk of the occurrence of electrically insulating oxide layers between the contact element 19 and the workpiece 9.

Figure 5:
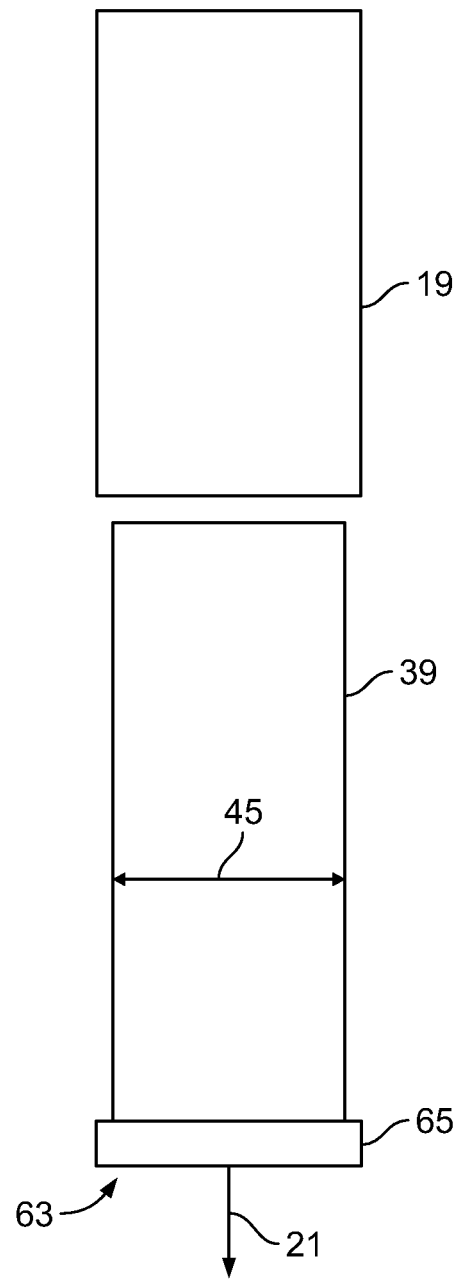
FIG. 5 is a schematic diagram of a central body of a projectile according to another embodiment.

FIG. 5 shows another embodiment of a central body 39 for the projectile 37. For better illustration, a sleeve-shaped contact element 19 is also shown in FIG. 5. The central body 39 of the second embodiment does not have a continuous cylindrical shape. Instead, it is provided with a shoulder 65 at its end 63 pointing in the shooting direction 21, which enlarges the diameter 45 of the central body 39. The shoulder 65 thus represents an enlargement of the cross-section for the central body 39.

The shoulder 65 may have the shape of a flange or a ring, as shown in FIG. 5. The diameter 45 of the central body 39 in the region of the shoulder 65 is such that the central body 39 cannot penetrate the sleeve-shaped contact element 19. As a result, the contact element 19 on the central body 39 in turn cannot be pushed beyond the shoulder 65. It is thus positively held by the shoulder 65 at least in the shooting direction 21. Because the shoulder 65 can hold the contact element 19 on the central body 39 at least in the shooting direction 21, there is no need for an additional interference fit or press-fit between the central body 39 and the contact element 19.

What is claimed is:

1. An arrangement for making a diffusion solder connection between an electrically conductive contact element and a workpiece, comprising:
    a protective chamber having a workpiece position at which at least a portion of the workpiece is arranged;
    an acceleration device shooting the electrically conductive contact element into the workpiece arranged at the workpiece position; and
    a projectile, the electrically conductive contact element forms at least a sub-portion of the projectile.

2. The arrangement of claim 1, wherein the projectile has a cylindrical shape.

3. The arrangement of claim 1, wherein the projectile has a central body with a cutting portion cutting free at least a portion of the workpiece.

4. The arrangement of claim 3, wherein the projectile has a supporting portion supporting the electrically conductive contact element.

5. The arrangement of claim 1, further comprising a heating element configured to heat the electrically conductive contact element before or during acceleration by the acceleration device.

6. The arrangement of claim 1, wherein the protective chamber has a negative pressure relative to a normal pressure outside the protective chamber.

7. A method for making a diffusion solder connection between an electrically conductive contact element and a workpiece, comprising:

providing a protection chamber having a workpiece position at which at least a portion of the workpiece is arranged; and shooting the electrically conductive contact element into the workpiece arranged at the workpiece position with an acceleration device, the electrically conductive contact element is mechanically and electrically conductively connected to the workpiece by the shooting, the electrically conductive contact element forms at least a sub-portion of a projectile.

8. The method of claim 7, wherein the electrically conductive contact element is shot into the workpiece as the projectile.

9. The method of claim 8, wherein the electrically conductive contact element remains in the workpiece and a remaining portion of the projectile detaches from the workpiece.

10. The method of claim 8, wherein the projectile cuts a portion of the workpiece free during movement through the workpiece.

11. The method of claim 10, wherein the electrically conductive contact element forms a diffusion solder connection with the portion of the workpiece that was cut free.

12. The method of claim 7, further comprising generating a bore extending through the workpiece.

13. The method of claim 12, wherein the electrically conductive contact element is shot into the bore after the bore is generated.

14. The method of claim 13, wherein the electrically conductive contact element and/or the projectile have a diameter larger than an inner diameter of the bore.

15. The method of claim 7, further comprising heating the electrically conductive contact element before shooting the electrically conductive contact element into the workpiece.

16. An arrangement for making a diffusion solder connection between an electrically conductive contact element and a workpiece, comprising:

a protective chamber having a workpiece position at which at least a portion of the workpiece is arranged;

an acceleration device shooting the electrically conductive contact element into the workpiece arranged at the workpiece position; and a heating element configured to heat the electrically conductive contact element before or during acceleration by the acceleration device.

\* \* \* \* \*